(12) United States Patent
Cavagna

(10) Patent No.: US 7,077,157 B2
(45) Date of Patent: Jul. 18, 2006

(54) SPRING-LOADED PRESSURE RELIEF VALVE, PARTICULARLY FOR CONTAINERS OF PRESSURIZED FLUIDS

(75) Inventor: Carlo Cavagna, Ponte S. Marco (IT)

(73) Assignee: Cavagna Group S.p.A., Ponte S. Marco (IT)

( * ) Notice: Subject to any disclaimer, the term of this patent is extended or adjusted under 35 U.S.C. 154(b) by 0 days.

(21) Appl. No.: 10/701,523

(22) Filed: Nov. 6, 2003

(65) Prior Publication Data

US 2004/0089347 A1   May 13, 2004

(30) Foreign Application Priority Data

Nov. 12, 2002   (EP) .................................. 02425688

(51) Int. Cl.
*F16K 17/10* (2006.01)
*F16K 43/00* (2006.01)

(52) U.S. Cl. .................... 137/491; 137/512; 137/614.2; 137/329.3; 137/329.4

(58) Field of Classification Search ............. 137/329.2, 137/329.3, 329.4, 490, 491, 512, 512.3, 613, 137/614.2; 251/28, 29
See application file for complete search history.

(56) References Cited

U.S. PATENT DOCUMENTS

| 2,664,102 | A | * | 12/1953 | Coberly | ........................ | 137/490 |
| 2,713,874 | A | | 7/1955 | Sundstrom | | |
| 2,882,922 | A | * | 4/1959 | Schindel | ..................... | 137/491 |
| 2,989,072 | A | | 6/1961 | Banker | | |
| 3,595,263 | A | * | 7/1971 | Greenlaw | ................... | 137/451 |
| 3,987,814 | A | * | 10/1976 | Hall | ........................... | 137/469 |
| 6,105,608 | A | * | 8/2000 | Katzman | .................... | 137/491 |
| 6,644,346 | B1 | * | 11/2003 | Conrads et al. | ............. | 137/491 |

FOREIGN PATENT DOCUMENTS

| DE | 11 78 656 | | | 9/1964 |
| DE | 36 39 327 | | | 6/1988 |
| EP | 0 717 821 | B1 | * | 6/1996 |
| FR | 2 109 652 | | | 5/1972 |
| FR | 2 671 156 | A1 | * | 7/1992 |

* cited by examiner

*Primary Examiner*—Ramesh Krishnamurthy
(74) *Attorney, Agent, or Firm*—Modiano & Associati; Albert Josif; Daniel O'Byrne

(57) ABSTRACT

A spring-loaded pressure relief valve, particularly for containers of pressurized fluids, comprising a valve body that is associable with a container and forms a discharge port that is controlled by a main piston; an auxiliary valve is further provided, which controls a venting port and drives the intervention of the main piston, such main piston being accommodated in a cavity that is formed in the valve body and is open in an axial direction on the opposite side with respect to the venting port.

20 Claims, 5 Drawing Sheets

SPRING-LOADED PRESSURE RELIEF VALVE, PARTICULARLY FOR CONTAINERS OF PRESSURIZED FLUIDS

BACKGROUND OF THE INVENTION

The present invention relates to a spring-loaded pressure relief valve, particularly for containers of pressurized fluids.

As is known, spring-loaded pressure relief valves are usually fitted on containers intended to contain pressurized fluids; such valves are designed to prevent the pressure from increasing beyond the limits for which the container has been manufactured.

The operating principle of these valves is based on the possibility to automatically discharge, without further intervention except for the intervention produced by the pressure of the involved fluid, a certified amount of fluid, so as to prevent the preset safety pressure from being exceeded, furthermore, interrupting such discharge when normal operating pressure conditions are reestablished.

Currently known spring-loaded pressure relief valves generally have a system for adjusting the opening pressure of the valve that is based on the compression of a spring, which by acting on the flow control piston that closes the discharge port of the valve contrasts the internal pressure that tends to open the piston.

The dimensions and shape of the port of the valve are defined so as to minimize the force applied to the spring in order to contrast the pressure inside the container.

The direct action of the spring on the piston, however, causes intense stress on the gasket of the sealing device, which, by being generally made of plastics acquires over time a deformation that corresponds to the shape of the valve port, consequently altering the initial set value.

In some cases, the difference between the initial set pressure and the actual intervention pressure, after a period of time that is not easy to quantify, exceeds the intended safety value and the device must be replaced.

Clearly, this situation forces to proceed to periodic inspections, with considerable financial burdens that can be further increased by the need to perform frequent valve replacements.

In order to try to solve this problem, solutions have already been devised, such as for example the one disclosed in patent FR2671156, which describes a spring-loaded pressure relief valve that, in order to reduce the force to be applied to the spring for contrasting the pressure inside the container, uses an auxiliary valve that controls a discharge port provided at a chamber that is formed in practice by the main piston, which has a passage that transfers into the chamber the pressure inside the container.

When an overpressure occurs, the auxiliary valve opens, and accordingly, since the pressure that acts on the main piston decreases, such piston opens, clearing a large port that allows the outward flow of the fluid that was causing the overpressure in the container.

This type of valve suffers several drawbacks, the first of which is constituted by the fact that the pressurized fluid is discharged in a radial direction with respect to the valve body, accordingly causing considerable problems in applications on tanks that contain flammable gases or liquids.

Furthermore, another problem is constituted by the fact that when it is necessary to replace the auxiliary valve, the intervention performed inevitably removes the setting of said valve and therefore in most cases it is necessary to disassemble the valve completely and to replace and consequently set the auxiliary valve directly at the factory, with the obvious associated problems.

SUMMARY OF THE INVENTION

The aim of the invention is to overcome the drawbacks noted above, by providing a spring-loaded pressure relief valve, particularly for containers of pressurized fluids, that allows to optimize the outflow of pressurized fluids, with the possibility to convey them correctly outward without causing problems for the surrounding environment.

Within this aim, an object of the invention is to provide a relief valve in which it is possible to act on the auxiliary valve, replacing it in situ, without having to empty the container and without replacing the entire valve or in any case without complex maintenance interventions that are difficult to perform in situ.

Another object of the present invention is to provide a spring-loaded pressure relief valve that thanks to its particular constructive characteristics is capable of giving the greatest assurances of reliability and safety in use.

Another object of the present invention is to provide a spring-loaded pressure relief valve that is easy to obtain starting from commonly commercially available elements and materials and is also competitive from a merely economical point of view.

This aim and these and other objects that will become better apparent hereinafter are achieved by a spring-loaded pressure relief valve, particularly for containers of pressurized fluids, according to the invention, comprising a valve body that is associable with a container and forms a discharge port that is controlled by a main piston, an auxiliary valve being further provided which controls a venting port and drives the intervention of said main piston, characterized in that said main piston is accommodated in a cavity that is formed in said valve body and is open in an axial direction on the opposite side with respect to said venting port.

BRIEF DESCRIPTION OF THE DRAWINGS

Further characteristics and advantages of the invention will become better apparent from the description of some preferred but not exclusive embodiments of a spring-loaded pressure relief valve, particularly for containers of pressurized fluids, illustrated by way of non-limiting example in the accompanying drawings, wherein.

DESCRIPTION OF THE PREFERRED EMBODIMENTS

Figure 1:
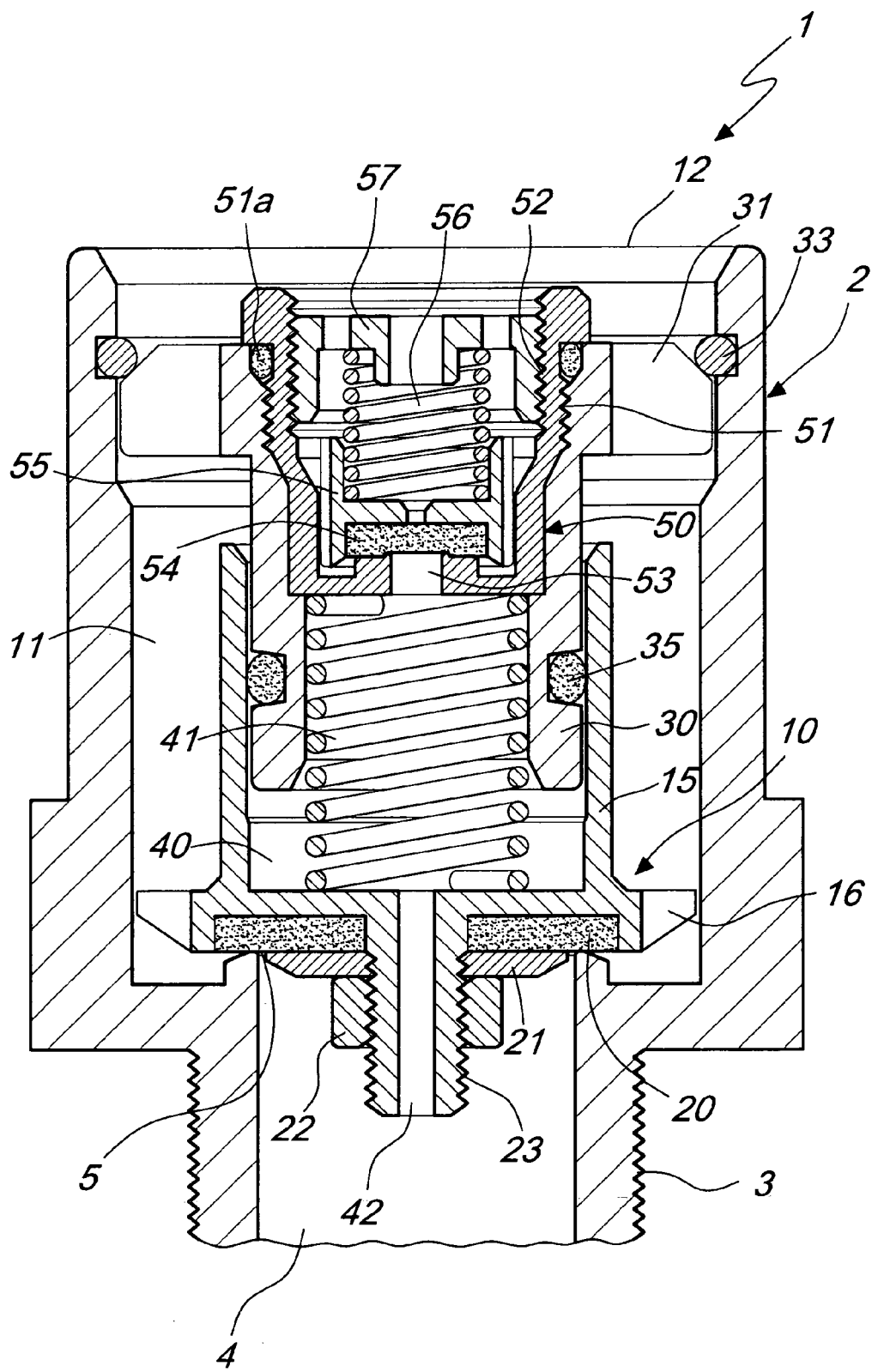
FIG. 1 is a sectional view of the spring-loaded pressure relief valve in a first embodiment of the invention.

With reference to the figures, the spring-loaded pressure relief valve, particularly for containers of pressurized fluids, according to the invention, generally designated by the reference numeral 1, comprises a valve body 2 that is provided with a threaded connector 3 for its connection to a container of pressurized fluid in general.

The connector 3 delimits a passage 4, which forms a discharge port 5 controlled by a main piston, generally designated by the reference numeral 10.

The piston 10 is accommodated in a preferably cylindrical cavity 11, which is formed in the valve body 2 and has, on the opposite side with respect to the discharge port 5, an open end, designated by the reference numeral 12, that forms in practice an outlet in an axial direction.

As shown in FIGS. 1 to 4, the piston 10 has a cylindrical piston body 15 which has, at its base, radial wings 16 that act as a guide for the sliding of the piston in the cavity 11, allowing to discharge the fluid when the valve is activated.

Figure 5:
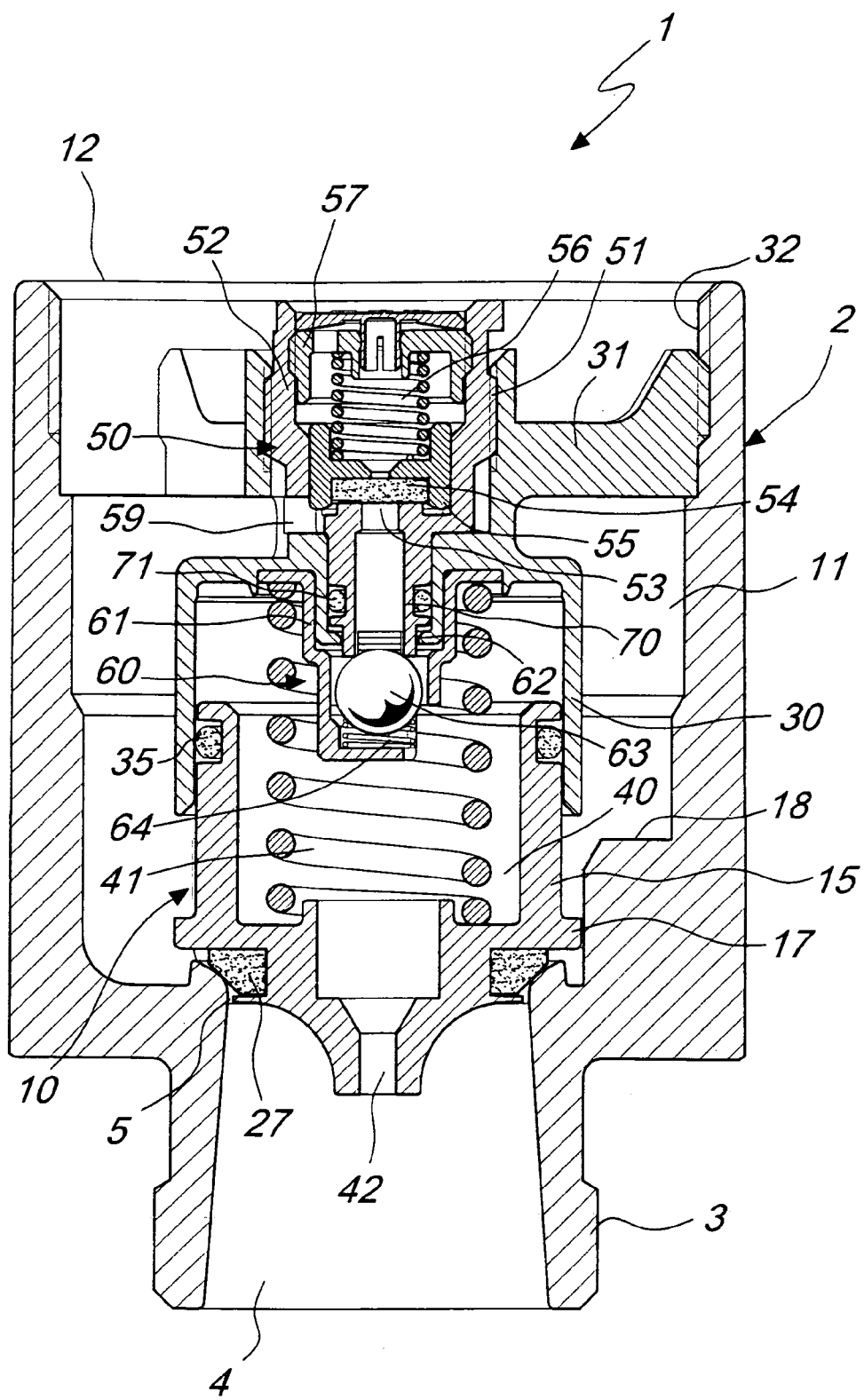
FIG. 5 is a view of a third embodiment of the relief valve with different means for guiding the main piston.

As shown in FIG. 5, it is also possible to provide a piston body, designated by the reference numeral 15a, that is predominantly cylindrical with a rim 17 that engages radial ridges 18, which are formed monolithically with the valve body inside the cavity 11 and guide the piston, with a solution that is constructively more advantageous than the preceding one.

Figure 2:
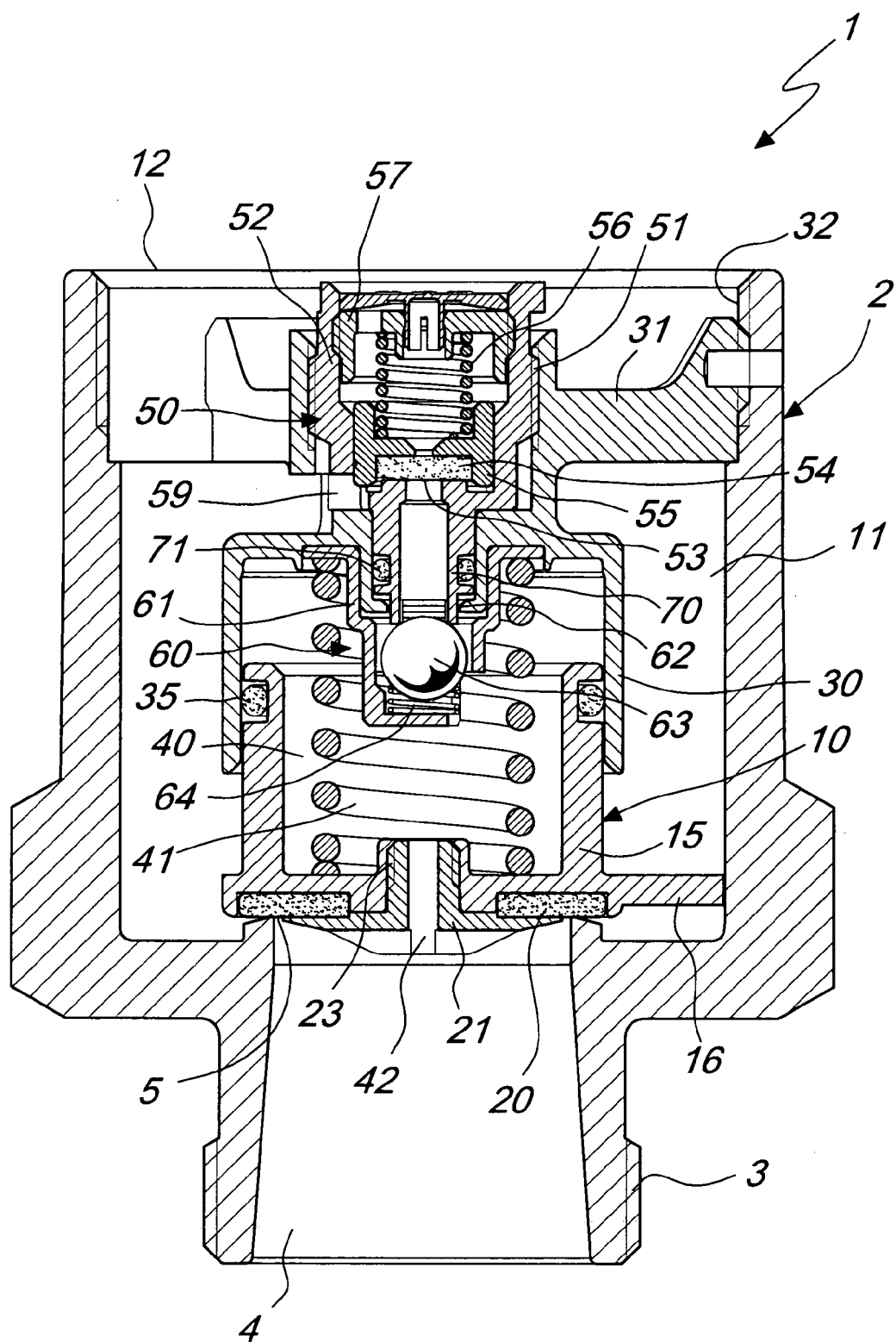
FIG. 2 is a view of a second embodiment of the valve with a one-way valve applied thereto.
Figure 3:
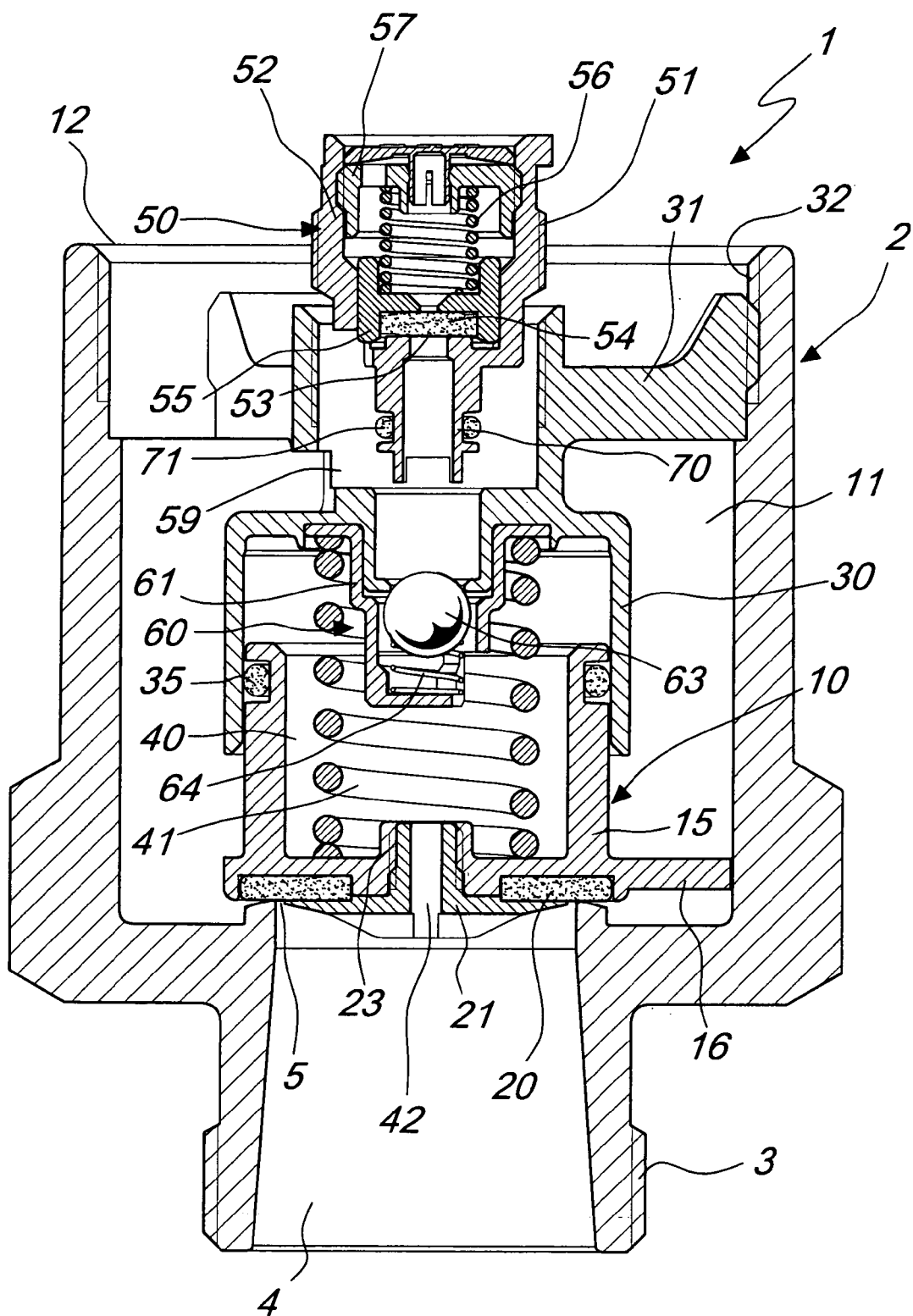
FIG. 3 is a view of the relief valve with the one-way valve shown in exploded view.

The sealing element supported by the piston 10 can be of various kinds; thus, for example, as shown in FIGS. 1 to 3, there is a flat sealing gasket, designated by the reference numeral 20, which is held in position by a washer 21 on which there acts a nut 22 that screws onto a threaded shank 23 or by means of a threaded shank 23, which is arranged axially.

Figure 4:
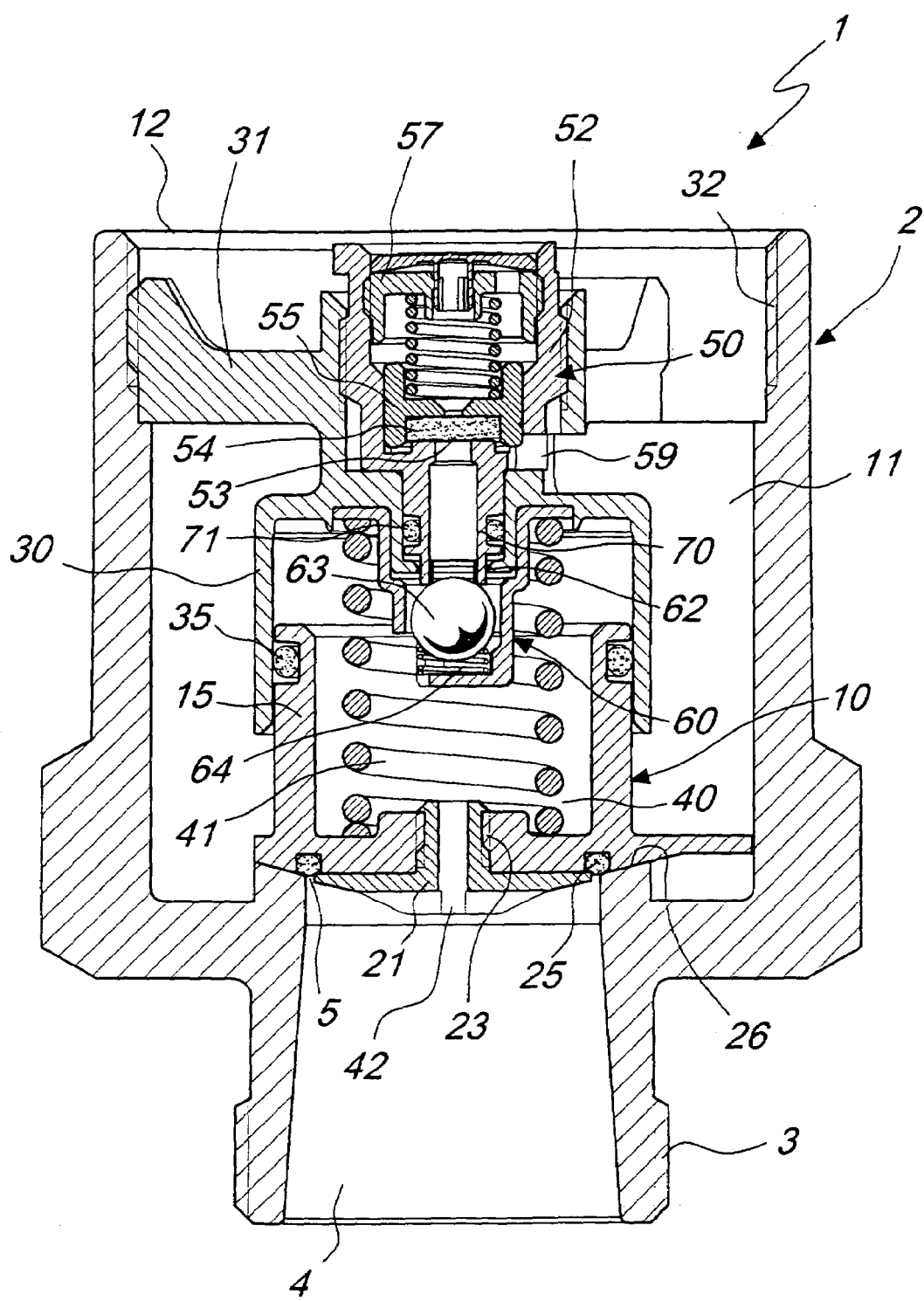
FIG. 4 is a view of the relief valve with a different solution for the seal of the main piston.

As shown in FIG. 4, the seal is provided by means of an annular gasket or O-ring 25, which is formed on the face of the piston 10 and acts on a frustum-shaped seat 26 formed by the port 5.

Optionally, as shown in FIG. 5, the seal is provided by means of a frustum-shaped gasket 27 that is fitted on the piston 10.

The piston 10 is guided slidingly on a cylindrical wall 30 that is arranged axially and is monolithically connected to a spoked body 31, which is kept in position by means of a threaded seat 32, as shown in FIGS. 2 to 5, or by means of an elastic ring 33, as shown in FIG. 1.

The body 15 of the piston, which mates hermetically with the cylindrical wall 30 by way of the interposition of a central gasket 35, forms a chamber 40, which accommodates a main spring 41 that pushes against the piston 10; the chamber 40 is connected to the inside of the container by means of a channel 42 that has a small diameter and preferably runs axially.

At the other end, the chamber is connected to an auxiliary valve, generally designated by the reference numeral 50, that engages a valve seat 51 formed by the spoked body 31 and has an auxiliary valve body 52 that can be applied in the valve seat 51 and forms a venting port 53 that is closed by means of an auxiliary gasket 54 supported by an auxiliary piston 55. The piston 55 is pushed by an auxiliary spring 56, which acts at its other end against a setting ring 57 that is set according to the operated pressure and retains its setting even if the auxiliary valve 50 is removed for replacement; said replacement can be performed very rapidly and easily, since the auxiliary valve is applied or removed without thereby affecting the setting that determines the intervention value.

According to the embodiment of FIG. 1, there is a sealing element 51a that acts between the seat 51 and the body 52, whilst in the embodiments shown in FIGS. 2 to 5 the seal for the chamber 40 is provided by means of a sealing element 71 that is provided on the central protrusion 70.

As shown in FIGS. 2 to 5, it is possible to provide at the venting port 53 a one-way valve, generally designated by the reference numeral 60, having a frame 61 that can be connected at an intermediate port 62 formed by the spoked body 31.

In the frame 61 there is a ball-type flow control element 63, which is pushed by a spring 64 of the one-way valve in order to place the flow control element 63 so that it closes the intermediate port 62.

In this embodiment, the auxiliary valve, again designated by the reference numeral 50, has a central protrusion 70, which when the auxiliary valve is assembled keeps the ball-type flow control element 63 spaced from the intermediate port 62, so that normal venting conditions are ensured.

If the valve 50 is removed, the ball-type flow control element is automatically arranged in the closed position.

For the sake of completeness in description, it should be also added that the seat 51 of the valve body can have, at its lower end, a radial opening, designated by the reference numeral 59, to allow the discharge of any fluid that flows through the venting port 53 toward the cavity 11, preventing in any case deposits inside the auxiliary valve.

When the pressure inside the container exceeds the preset level, the pressure inside the chamber 40 opens the venting port 53 by way of the retraction of the auxiliary gasket 54, and accordingly the pressure in the chamber 40 decreases with respect to the value of the pressure that is present inside the container, so that the balance of the forces is altered and the main piston 10 opens with respect to the port 5, with a flow-rate that is proportional to the size of the discharge port.

The discharged fluid, thanks to the particular shape of the valve, is made to exit in an axial direction and therefore does not interfere with other elements located proximate to the valve.

Since the chamber 40 is connected to the inside of the container by means of the channel 42, which has a smaller cross-section than the venting port 53 of the auxiliary valve, the balance between the pressure inside the chamber 30 and the pressure inside the connector 4 can be restored only when the pressure inside the chamber 40 allows the auxiliary piston 55 to close the venting port 53 by means of the gasket 54.

When the pressure balance condition is produced, the main piston is returned by the spring 41 to the closed position on the sealing seat 5 and the discharge of the flow is interrupted.

With the arrangement described above, therefore, a separation is provided between the function of adjusting the pressure at which discharge starts, which is obtained by way of the auxiliary valve, which is small and does not have pressure discharge capability requirements, whilst the discharge function occurs by opening the main piston that controls the discharge port of the valve.

The geometric shape of the venting port of the auxiliary valve, by not having requirements aimed at the discharge flow-rate, can be given dimensions that provide the best distribution of the load applied by the spring to the piston, and it is therefore possible to achieve a reduced deformation of the gasket element, which allows to limit over time the variation of the initial setting.

The closure of the discharge port by means of the main piston is achieved partly by the action of the spring 41 and partly by the action of the pressure of the fluid inside the chamber 40, which acts in a balanced manner on said piston.

In this manner, the gasket fitted to the main piston in order to close the discharge port 5 does not require a force that corresponds to the thrust determined by the pressure that occurs inside the container, and accordingly its deformation is very limited over time and does not cause significant functional variation effects.

Furthermore, the particular structure of the valve, in addition to allowing discharge in an axial direction, allows to replace the auxiliary valve without having to act on the remaining components of the valve, since it is possible to remove the valve without acting on the settings of the spring that pushes the auxiliary gasket.

It should also be noted that if the one-way valve is provided, it is possible to remove the auxiliary valve, preventing the discharge valve from opening the main piston; in these conditions, thanks to the presence of the one-way valve 60, removal of the auxiliary valve in fact allows to achieve immediately the closure of the intermediate port and accordingly to maintain stable conditions for the valve and does not require the disassembly of said valve from the pressurized container.

From the above description it is therefore evident that the invention achieves the intended aim and objects, and in particular the fact is stressed that the spring-loaded pressure relief valve according to the invention allows to provide a balanced distribution of the forces applied by the pressure inside the container, reducing deformation, this advantage being achieved mainly by the presence of the chamber provided between the main piston and the central piston or the cylindrical wall; furthermore, the structure that is used allows to act on the valve without being always forced to remove the valve completely from the pressurized container.

The invention thus conceived is susceptible of numerous modifications and variations, all of which are within the scope of the appended claims.

All the details may further be replaced with other technically equivalent elements.

In practice, the materials used, as well as the dimensions and contingent shapes, may be any according to requirements.

The disclosures in European Patent Application No. 02425688.5 from which this application claims priority are incorporated herein by reference.

What is claimed is:

1. A spring-loaded pressure relief valve, particularly for containers of pressurized fluids, comprising a valve body that is associable with a container and forms a discharge port that is controlled by a main piston, an auxiliary valve being further provided which controls a venting port and drives the intervention of said main piston, said main piston is accommodated in a cavity that is formed in said valve body and is open in an axial direction on the opposite side with respect to said venting port, wherein said auxiliary valve is provided with an auxiliary body and is removably engaged with a valve seat of said valve body, said venting port being closed by means of an auxiliary gasket supported by an auxiliary piston which is pushed by an auxiliary spring acting at its other end against a setting ring and suitable to be adjusted according to a settled operated pressure and suitable to retain its setting even if said auxiliary valve is removed for replacement.

2. The pressure relief valve according to claim I, wherein said cavity has a cylindrical shape.

3. The pressure relief valve according to claim 1, wherein said main piston has a cylindrical piston body with radial guiding wings at its base.

4. The pressure relief valve according to claim 1, wherein said piston body has a substantially cylindrical shape with a rim that engages the radial guiding ridges formed monolithically with said valve body inside said cavity.

5. The pressure relief valve according to claim 1, wherein said main piston has a sealing element constituted by a flat sealing gasket.

6. The pressure relief valve according to claim 1, wherein said main piston has a sealing element constituted by an annular gasket that has a circular cross-section.

7. The pressure relief valve according to claim 1, wherein said main piston has a sealing element that is constituted by a frustum-shaped gasket.

8. The pressure relief valve according to to claim 1, comprising a cylindrical wall that can be coupled hermetically to said piston body and forms a chamber for accommodating a main spring that pushes against said main piston, said chamber being connected to the inside of the container by means of a channel that has a small diameter.

9. The pressure relief valve according to claim 8, wherein said venting port of said auxiliary valve leads at said chamber.

10. A spring-loaded pressure relief valve, particularly for containers of pressurized fluids, comprising a valve body that is associable with a container and forms a discharge port that is controlled by a main piston, an auxiliary valve being further provided which controls a venting port and drives the intervention of said main piston, comprising one-way valve that is arranged at said venting port and is adapted to block said venting port when said auxiliary valve is removed.

11. The pressure relief valve according to claim 10, wherein said cavity has a cylindrical shape.

12. The pressure relief valve according to claim 10, wherein said main piston has a cylindrical piston body with radial guiding wings at its base.

13. The pressure relief valve according to to claim 10, wherein said piston body has a substantially cylindrical shape with a rim that engages the radial guiding ridges formed monolithically with said valve body inside said cavity.

14. The pressure relief valve according to claim 10, wherein said main piston has a sealing element constituted by a flat sealing gasket.

15. The pressure relief valve according to claim 10, wherein said main piston has a sealing element constituted by an annular gasket tat has a circular cross-section.

16. The pressure relief valve according to claim 10, wherein said main piston has a sealing element that is constituted by a frustum-shaped gasket.

17. The pressure relief valve according to claim 10, comprising a cylindrical wall that can be coupled hermetically to said piston body and forms a chamber for accommodating a main spring that pushes against said main piston, said chamber being connected to the inside of the container by means of a channel that has a small diameter.

18. The pressure relief valve according to claim 17, wherein said venting port of said auxiliary valve leads at said chamber.

19. The pressure relief valve according to claim 10, wherein said auxiliary valve has an auxiliary valve body that can be applied in a valve seat that forms said venting port, an auxiliary gasket acting at said venting port and being supported by an auxiliary piston on which an auxiliary spring acts, said auxiliary spring being connected at its other end to a setting ring that is accommodated in said auxiliary valve body.

20. The pressure relief valve according to claim 17, wherein said one-way valve comprises a frame that can be connected at an intermediate port tat is formed by a spoked body that supports said cylindrical wall, said frame accommodating a ball-type flow control element that is pushed by a spring of the one-way valve in order to move said bail-type flow control element so that it closes said intermediate port when a central protrusion formed by said auxiliary valve moves away.

* * * * *